J. E. PAGE.
BARBED FENCE-WIRE.
No. 170,891. Patented Dec. 7, 1875.
FIG. I.
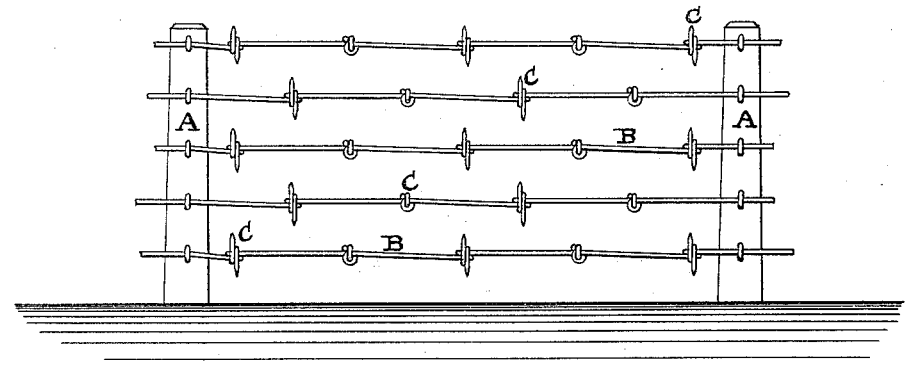
FIG. II.
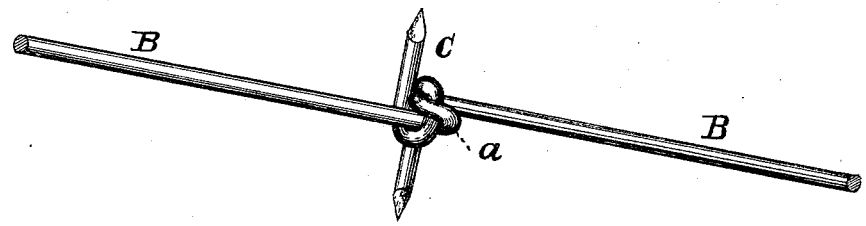
WITNESSES
H. A. Daniels
C. Myers
INVENTOR
Justus E. Page
by W. T. Howard
attorneys

UNITED STATES PATENT OFFICE.

JUSTIN E. PAGE, OF SYCAMORE, ILLINOIS.

IMPROVEMENT IN BARBED FENCE-WIRES.

Specification forming part of Letters Patent No. 170,891, dated December 7, 1875; application filed June 26, 1875.

*To all whom it may concern:*

Be it known that I, JUSTIN E. PAGE, of Sycamore, De Kalb county, Illinois, have invented certain Improvements in Barbed-Wire Fences, of which the following is a specification, reference being had to the accompanying drawing forming a part hereof.

My invention relates to a fence made of rods of wire running longitudinally and parallelly with each other, the said rods having, at short distances apart, a link or turn therein, through which a double-pointed barb is passed and correspondingly linked or turned, by which simple operation the barb is held securely in place.

Figure 1 is an elevation of a portion of a barbed fence constructed after my invention. Fig. 2 is a perspective view of a wire and barb detached from the fence.

The fence consists, as seen in Fig. 1, of the ordinary uprights A, bearing the wires B at suitable distances apart, the wires being secured to the uprights by staples or other means. The wires B are provided with turns or eyes $a$, through which the double-pointed barbs C are passed and linked or turned, as shown particularly in Fig. 2. The connection thus formed between the wire B and barb C is such as to prevent a movement of the barb in any direction.

The different barbs, when in position, will, because of irregularity in the eyes $a$, point in all directions, and form an effectual obstacle to the rubbing of cattle against the fence, or the pressing of the wires apart.

I do not claim making the eye $a$ in the wire B or in the barb, or the attachment of one or more double-pointed barbs in said eye by means of staples or any other device; but my invention is intended to simplify, cheapen, and strengthen the fence, by making the barb itself to operate jointly with the eye as its own fastener, thus dispensing with other fastening parts, which may loosen and cause the barb to become detached; therefore,

What I claim as my invention is—

In combination with the wire B, having the eye or turn $a$, the double-pointed barb C, having a corresponding eye or turn therein, said wire and barb being thereby attached, as herein described, and for the purposes specified.

In testimony whereof I have hereunto subscribed my name this 12th day of June, in the year of our Lord 1875.

JUSTIN E. PAGE.

Witnesses:
WILLIAM VANDEBERGH,
A. LAVATOR DUNMORE.